(No Model.)  10 Sheets—Sheet 1.

F. F. RAYMOND, 2d.
SOLE NAILING MACHINE.

No. 322,562.  Patented July 21, 1885.

WITNESSES  Fig. 1.  INVENTOR

(No Model.)

F. F. RAYMOND, 2d.
SOLE NAILING MACHINE.

No. 322,562. Patented July 21, 1885.

WITNESSES.
Fred. B. Dolan.
J. M. Dolan.

INVENTOR.
F. F. Raymond

(No Model.) 10 Sheets—Sheet 5.

F. F. RAYMOND, 2d.
SOLE NAILING MACHINE.

No. 322,562. Patented July 21, 1885.

WITNESSES
Fred. B. Dolan.
J. M. Dolan.

INVENTOR
F. F. Raymond (No Model.)   
F. F. RAYMOND, 2d.  
SOLE NAILING MACHINE.

No. 322,562.  
Patented July 21, 1885.

WITNESSES.  
Fred. B. Dolan.  
J. M. Dolan.

INVENTOR.  
F. F. Raymond (No Model.)  10 Sheets—Sheet 7.

F. F. RAYMOND, 2d.
SOLE NAILING MACHINE.

No. 322,562.  Patented July 21, 1885.

WITNESSES.  INVENTOR.

(No Model.)  10 Sheets—Sheet 8.

F. F. RAYMOND, 2d.
SOLE NAILING MACHINE.

No. 322,562.  Patented July 21, 1885.

WITNESSES.
Fred. B. Dolan
J. M. Dolan.

INVENTOR.
F. F. Raymond (No Model.)

F. F. RAYMOND, 2d.

SOLE NAILING MACHINE.

Patented July 21, 1885.

WITNESSES.
Fred. B. Dolan
J. M. Dolan.

INVENTOR.
F. F. Raymond (No Model.)

F. F. RAYMOND, 2d.
SOLE NAILING MACHINE.

Patented July 21, 1885.

WITNESSES
Fred. B. Dolan.
J. M. Dolan.

INVENTOR
F. F. Raymond

UNITED STATES PATENT OFFICE.

FREEBORN F. RAYMOND, 2D, OF NEWTON, MASSACHUSETTS.

SOLE-NAILING MACHINE.

SPECIFICATION forming part of Letters Patent No. 322,562, dated July 21, 1885.

Application filed April 25, 1885. (No model.)

*To all whom it may concern:*

Be it known that I, FREEBORN F. RAYMOND, 2d, of Newton, in the county of Middlesex and State of Massachusetts, a citizen of the United States, have invented a new and useful Improvement in Sole-Nailing Machines, of which the following is a full, clear, and exact description, reference being had to the accompanying drawings, forming a part of this specification, in explaining its nature.

The invention relates to a machine for attaching outsoles to inner soles of boots or shoes by a gang or group of fastenings simultaneously driven; also, to the combination and arrangement in such a machine of devices for simultaneously driving said sole-fastenings with devices for automatically distributing and feeding said fastenings in an arrangement or shape for simultaneous driving by the nail-driving devices; also, to the combination in such a machine of devices for automatically supplying the distributer with said sole-fastenings; also, to the arrangement and combination of a sole-molding device with the automatic nail-driving devices; also, the combination of the automatic sole-nailing devices with the beating-out device.

It further relates to various combinations of devices and details of construction all of which will hereinafter be more fully described.

Referring to the drawings, Figs. 13 and 15 represent in vertical section and elevation, and Fig. 14 in plan, variations in the arrangements of certain of the operative devices, to which reference will hereinafter be made. Fig. 27 is a side elevation of the post and carriage, illustrating the carriage or templet locking device, and a portion of the mechanism for automatically unlatching it.

The invention is an improvement upon the various devices described in Letters Patent No. 252,215, dated January 10, 1882, No. 259,687, dated June 20, 1882, No. 287,472, dated October 30, 1883, No. 290,109, dated December 11, 1883, and in my applications filed July 17, 1884, allowed April 8, 1885, Serial No. 137,980, January 13, 1885, Serial No. 152,725, and in the applications of H. A. Henderson and myself, filed March 18, 1885, allowed April 18, 1885, Serial No. 159,278; and it consists in the arrangement and adaptation of various of the devices described in said patents and applications, and their combination with each other and with certain other necessary devices, whereby an organized machine for automatically securing or fastening outsoles to insoles by a gang or group of fastenings simultaneously fed and driven is provided, and also whereby the outsole is molded after it is placed in position for attachment to the insole, and after said attachment and without the removal of the boot or shoe from its jack or work support is beaten out.

The elements necessary for the machine are:

First. A jack for supporting the form or last for holding the work during the sole forming, nailing, and beating-out operations; and this last or work-support must be of the character ordinarily used in the beating-out machines—that is, it must be a solid metal last with a large bearing or supporting surface to rest upon the spindle or support for holding the same.

Second. A pressure-plate, which is movable vertically in relation to the last or work-support, and which has formed in its under surface a cavity or mold suitable for molding or forming the outsole upon the iron bottom of the last. This pressure-plate is preferably movable horizontally into and out of operative position, and is moved vertically upon the work-support to mold the outsole upon the insole and to hold it compressed or clamped upon the insole of the boot or shoe during the pricking and nailing operation. This pressure or templet plate must have holes arranged to open within the line of the cavity or mold at a uniform distance therefrom and from each other, in which the awls are reciprocated, and from which the fastening-nails are simultaneously driven.

Third. The nail-carrier for transferring the nails from a position in which the nails can be automatically fed or delivered thereto to the holes in the templet or pressure plate.

Fourth. The nail-distributing device for receiving the nails automatically fed, and for arranging and holding them for automatic delivery to the nail-carrier.

Fifth. A nail-making or nail-feeding device for either making the nails and delivering them automatically to the nail distributer, or for sorting ready-made nails and delivering them automatically to the distributer, as may be preferred. In the drawings I have represented a nail-making device.

Sixth. A reciprocating presser-block arranged to move upon the pressure-plate and to force it downward upon the outsole before the awls are driven.

Seventh. A locking device for automatically holding the pressure-plate locked down upon the outsole and work-support after it has been moved vertically thereon by the pressure-block.

Eighth. A reciprocating gang of awls of varying length for pricking holes of uniform depth in the outsole.

Ninth. A gang or group of drivers of varying lengths adapted to be reciprocated vertically, and to drive the fastenings from the nail-carrier and pressure-plates a uniform distance into the out and in soles, so that the ends of the nails shall be left flush with the surface of the outsole, or, if channel-nailed, with the surface of the channel.

Tenth. A device for automatically unlatching the pressure-plate upon the withdrawal of the gang or group of drivers, in order that the templet and nail-carrier plates may be lifted and moved horizontally from over the work-support out of operative position.

Eleventh. A beating-out form or mold adapted to be moved vertically upon the nailed outsole to subject it to a beating-out or molding pressure, whereby the ultimate form or shape is imparted to the outsole.

Twelfth. Devices for automatically bringing into operative position, successively, the presser-block, awls, drivers, and beating-out devices.

Thirteenth. Devices for accelerating the movement of the cross-head, pressure-block, awls, drivers, or beating-out block or form during the lower portion of their reciprocating movement, whereby the striking-power of these parts is increased, and the nails driven by the sudden impact of the drivers rather than by pressure.

Fourteenth. Devices for holding the beating-out form or mold down upon the outsole. This feature of the invention is applicable for use more especially when two or more lasts or work-supports adapted to be brought successively into operative position are used instead of one only; and it is herein represented as accomplished by stopping the machine with the cross-head in its lowest position. When this form of construction is employed, it will also be necessary to arrange the stop-motion mechanism so that the machine when again started shall make but half a revolution of the main shaft, whereby the cross-head is caused to lift from its lowest position to its highest and then stop, in order that the work may be removed and new work brought into position.

A A' are the side frames of the machine; $a$, the bed; B, a sliding jack having a sleeve, $b$, in which is a post, $b'$, having a screw-thread, $b^2$, at its lower end, upon which is the stationary nut, $b^3$, by which it is vertically movable. This post $b'$ has a spindle, $b^4$, for receiving the last or shoe-support, and the arm $b^5$, which has at its forward end the curved support $b^6$, upon which the forward end of the shoe-support rests. This arm $b^5$ is vertically movable upon the post $b'$, and this adjustment is represented in the drawings as being provided by the sleeve $b^7$, which surrounds the post, and the screw-thread $b^8$ upon the post, and the nut $b^9$, which screws thereon, and upon the upper surface of which the sleeve rests. Of course any other suitable jack may be used in lieu of this.

C is the templet or pressure plate. It is supported upon the table or carriage $c$, which is vertically movable upon the post $c'$, and preferably is moved automatically into and out of position by means of the lever $c^2$ and cam $c^3$. There is formed in the under surface or front portion of this templet or pressure plate a cavity, $c^4$, which is substantially the converse in shape of the upper surface of the last or shoe-support. The shape of this surface is well shown in Fig. 1. There are arranged in the said templet-plate the holes $c^5$, which are placed to open into the cavity $c^4$ at a proper distance from the outer line of the cavity.

D is a nail-carrier plate, which has holes $d$, corresponding in location to those of the templet or pressure plate, and which is moved preferably by the lever $d'$ and cam $d^2$ to automatically transfer the nails from where received to a position where delivered.

E is a plate or block attached to a revolving head, E', and carrying a gang or group of awls, which correspond in location with the holes in the templet or pressure plate.

F is a plate or block supporting a gang or group of drivers which correspond in location with the holes in the templet C. The plate is also supported by the revolving head.

G is a beating-out block, which has a cavity, $g$, similar in shape to that of the templet-plate C, and this is also supported by the revolving head. The revolving head is carried by the cross-head $A^2$, which may be reciprocated by the mechanism substantially as specified in the Henderson patent, No. 259,687, dated June 20, 1882, or in any other equivalent way; but I prefer the mechanism hereinafter described.

Figure 19:
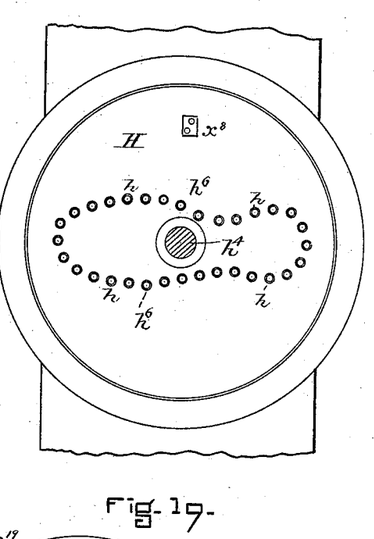
Fig. 19 is a horizontal section upon the line 2 2 of Fig. 15.

The nail-holder plate H, which receives and holds the nails made by the nail-making device, is shaped in plan as represented in Fig. 19, and has the holes $h$, corresponding in location and arrangement to the holes in the nail-carrier and in the templet-plate. It also has a sliding bottom plate, $h'$, which is moved to open the holes $h$ by the pin $h^2$ on the nail-carrier D upon its backward movement, and the plate $h'$ is moved in the reverse direction to close the holes by the spring $h^3$. The nail-holder is attached to the disk H' by a post, $h^4$, and its holes $h$ are connected with holes $h^5$ in the disk by means of the tubes $h^6$. The disk is supported by the plate $H^2$, and its holes are arranged on a circular line and at uniform distances apart. It is intermittingly revolved to bring the holes $h^5$ successively in position beneath the throat $h^7$ by the lever $h^8$, operated by the cam $h^9$ upon the shaft K and the pawl $h^{10}$, which engages with the ratchet-wheel $h^{11}$. The disk is prevented from being moved more than the required distance and is held locked when each of the holes $h^5$ is in register with the throat $h^7$ by means of the lock K', which is moved vertically by the cam $k$ and connecting-rod $k'$, and which is adapted to be engaged at intervals, as hereinafter stated, with the teeth $H^3$, which are formed upon the block $H^4$, attached to the disk H' to project upward therefrom. The movements imparted to the lock are such as to cause the teeth or projections $H^5$ thereon to be moved into line with the teeth or projections $H^3$ of the block $H^4$ immediately after the beginning of the feed-motion of the disk; or, in other words, upon the beginning of the operation of the pawl $h^4$ in moving or revolving the disk. This brings into line a series of abutments against which the feed-pawl forces the teeth $H^3$ upon the block $H^4$, so that when the feed-pawl reaches the end of its throw the disk H' is held locked by it and by the teeth $H^5$ of the lock K', and is prevented from being revolved any further, and this position brings a hole, $h^5$, in the disk in register with the throat. The lock remains stationary during the backward movement of the feed-pawl, and immediately before the pawl begins its next movement forward the block is lifted by its operating-cam $k$ sufficiently to permit the teeth upon the block $H^4$ to pass the locking-teeth $H^5$ when it is shut down by the cam to bring the locking projections or abutments into place to act as stops.

Figures 20, 21, 22:
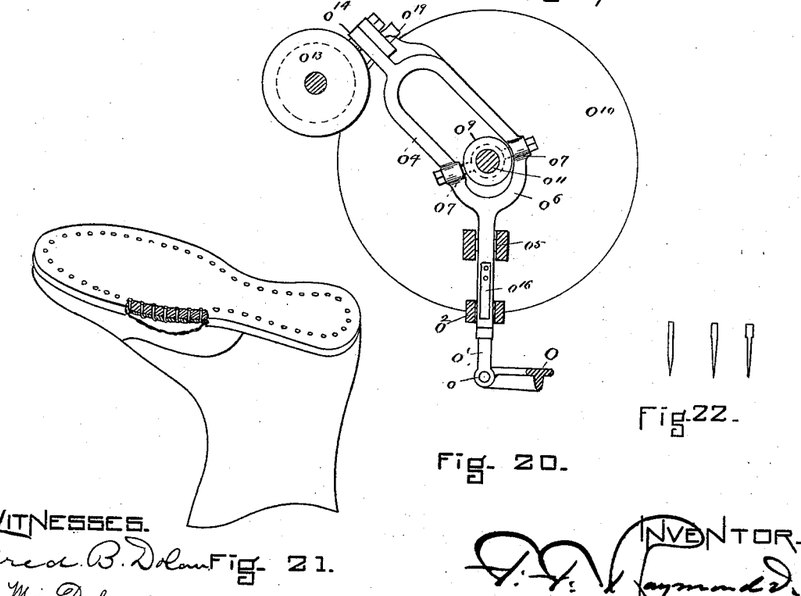
Fig. 20 represents a vertical section upon the line 3 3 of Fig. 8 and an elevation to the left of said line.
Fig. 21 represents a shoe with the outsole attached, a portion thereof being broken out to show the fastening.
Fig. 22 shows in elevation various forms of the fastening which I prefer to use.
Figures 23, 24:
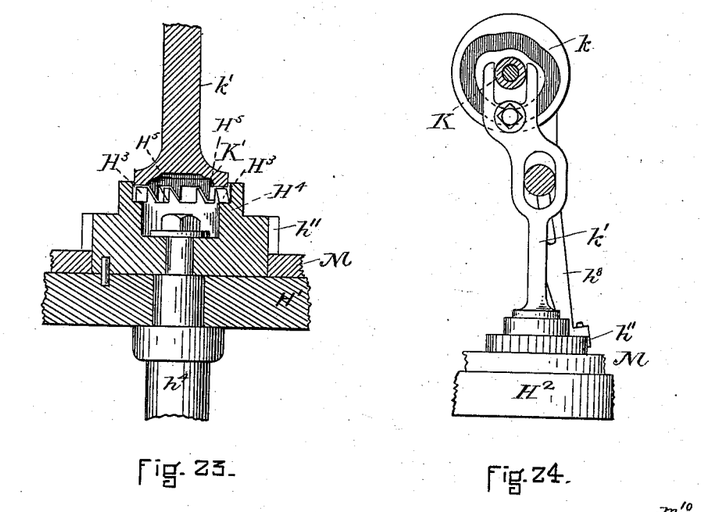
Fig. 23 is an enlarged view in vertical central section of the device for locking and registering the nail-distributer, hereinafter described.
Fig. 24 is a view in section and elevation representing the devices for operating and then locking the nail-distributer.
Figures 25, 26:
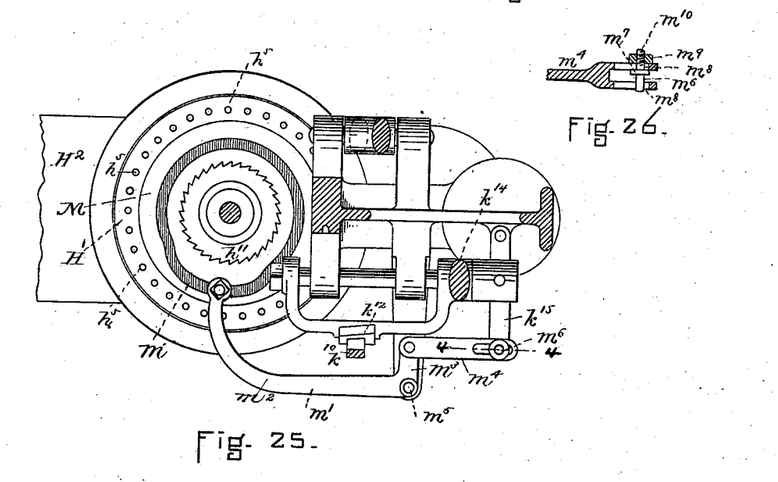
Fig. 25 is a view, enlarged, in horizontal section and plan, of the devices for automatically varying the length of the nails made and fed.
Fig. 26 is a vertical section on the dotted lines 4 4 of Fig. 25.

Any form of nail may be fed to the distributer; but the one which I prefer is a nail made of wire and having a sharp chisel-point formed by two long tapering surfaces, as shown in the forms in Fig. 22; and I prefer to make this nail by devices which feed the wire from a reel by the feed-rolls $k^2$ or other feeding devices through the feedway $k^3$ in the block $k^4$ to the cutters $k^5$, which are fastened or secured to the block $k^6$, and are reciprocated across the feedway to form the beveled point to the nail, and also to sever the pointed nail from the wire, the operation of pointing and severing being simultaneously done upon one reciprocation of the cutters, so that a nail is severed and the end of the wire pointed, and the pointed wire is then fed forward past the cutters and another nail severed in its turn.

The block supporting the cutters is reciprocated by means of the lever $k^7$, pivoted at $k^8$, and the cam $k^9$. The movement of feeding the wire into position expels the previously-cut nail from the throat, if it has not fallen by gravity, so that the wire itself is used as a feeding device.

The feed which I prefer to use comprises the rolls $k^2$, one of which is fixed to the shaft K, but is not shown, and the other of which is attached to the spring-arm $k^{10}$, and has the pinion $k^{11}$, which meshes when the rolls are together with a pinion on the feed-roll on the shaft $k$. The time that these rolls are in contact fixes the extent of the feed of the wire and the length of the nail. This time is varied to make longer or shorter nails by means of the wedge-block $k^{12}$, which is oscillated past the end of the spring-arm $k^{10}$, to alternately move the same outward and hold it outward for a certain portion of the revolution of the shaft and then permit it to return. This oscillating movement is produced by means of the cam $k^{13}$ on the shaft K and the lever $k^{14}$. The wedge-block with its support is movable transversely the line of the oscillation by the lever or arm $k^{15}$, whereby its position in relation to the end of the spring-arm or lever $k^{10}$ to determine the duration of the contact of the two feed-rolls is varied, as if the wedge-block be moved in one direction the movable feed-roll is held longer from the stationary feed-roll than if it be moved in the other direction; and when it be so held of course the feed is shorter, and when of course moved in the opposite direction the feed must be longer. A fuller description of this feeding mechanism will be found in the specification forming a part of a patent to Erastus Woodward and Horace Weeks, dated July 1, 1884, No. 301,464. It is desirable, however, that nails of varying lengths be used in attaching soles, shorter nails being required, generally, in the shank than at the heel or the ball and toe; and when a half or tap sole is used, the nails for the front portion of the sole must be considerably longer. It is desirable of course that this variation in the length of the nail used shall be automatically made, and this is done by securing to the disk H', to be revolved therewith, a ring or disk, M, having a cam-groove, $m$, which controls by connecting mechanism hereinafter specified the position of the wedge-block $k$ $k$ $k^{12}$ of the variable feed-adjusting device, so that the longer and shorter nails are immediately made and delivered as the requirements of the work may demand. The connecting mechanism in this case comprises the lever $m'$, one arm, $m^2$, of which has the cam-roll, which fits in the cam-groove $m$, and the other arm, $m^3$, of which is attached at one end of a link, $m^4$, which connects it with the variable feed, lever or arm $k^{15}$. The lever $m'$ is pivoted at $m^5$. The variable feed-arm or lever $k^{15}$ is adjustable upon the end of the link by means of the pin $m^6$, having the clamping-plate $m^7$, the slot $m^8$, and the clamping-nut $m^9$ and screw $m^{10}$.

The wire may be corrugated or indented before it is placed in the machine; or it may be serrated, recessed, roughened, or grooved by cutters or burrs reciprocated by the cutter-holding block in passages which extend across the feed-way, as described in my application for patent for nailing-machine of even date herewith.

Figure 1:
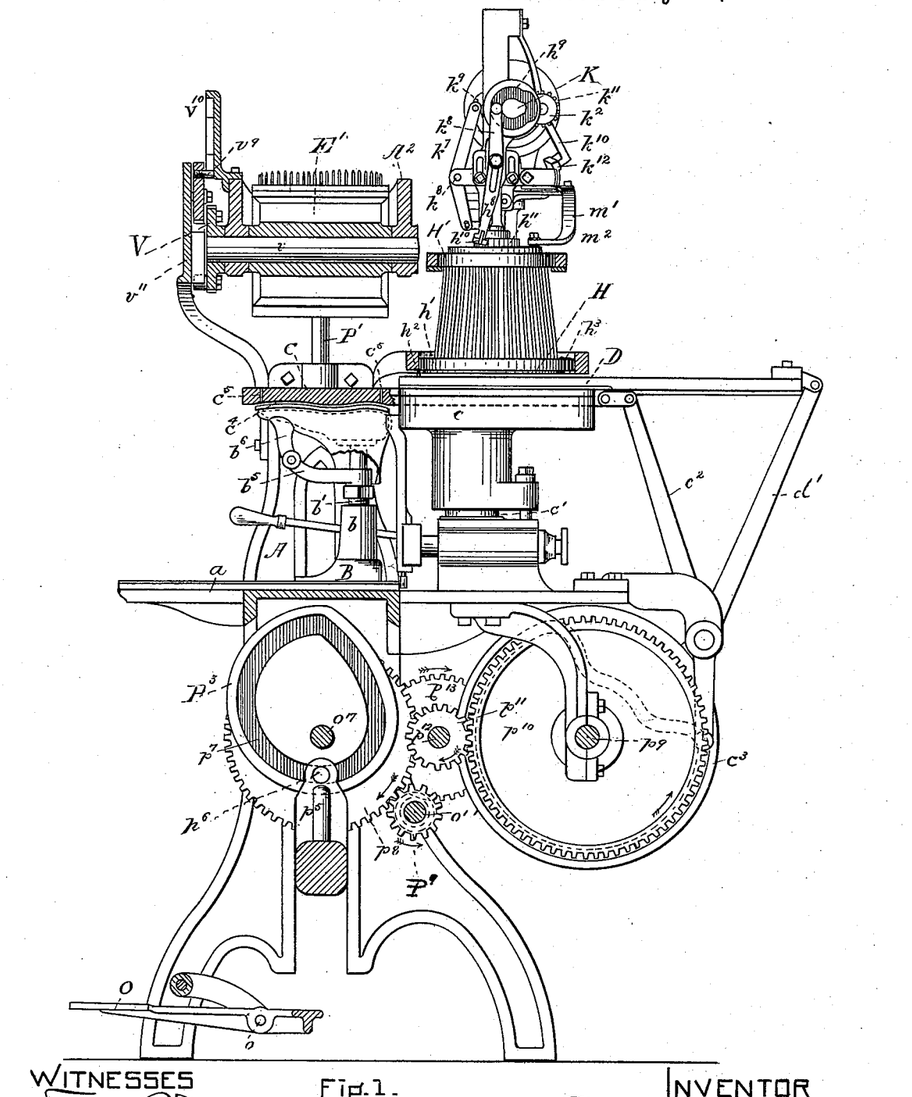
Figure 1 is a view, part in vertical central section and part in side elevation, of a machine containing the features of my invention, the section being upon the line *x x* of Fig. 2, and the parts represented in elevation are those at the right hand of said line.
Figure 2:
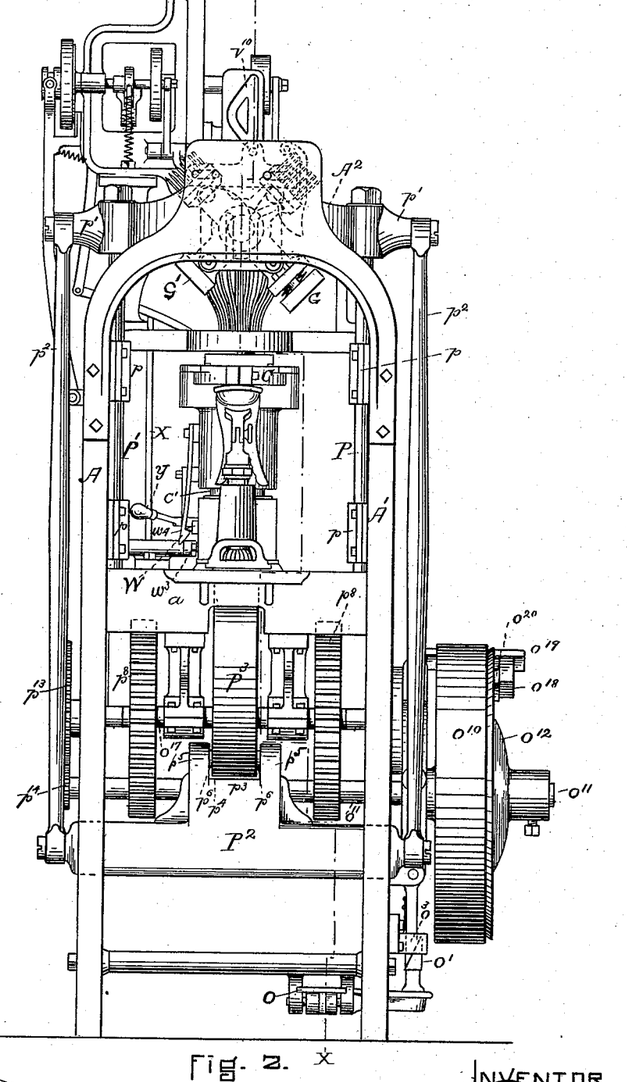
Fig. 2 is a front elevation of the machine.
Figure 3:
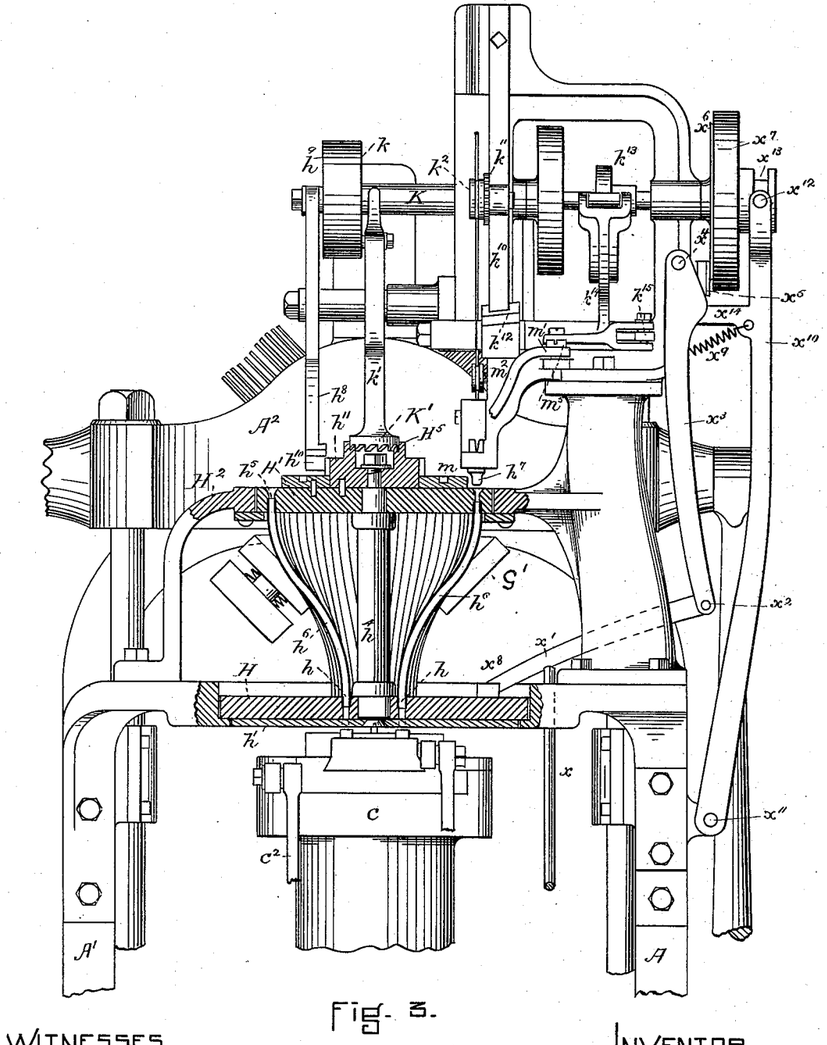
Fig. 3 is a view enlarged, part in rear elevation and part in section, showing especially the nail making and feeding devices.
Figure 4:
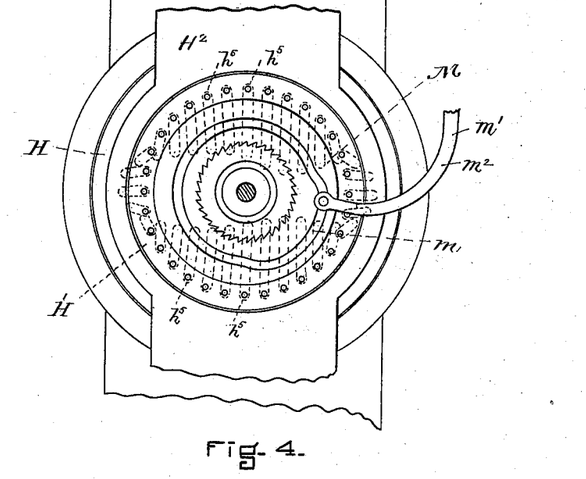
Fig. 4 is a plan view of the nail-distributer and adjacent parts.
Figure 5:
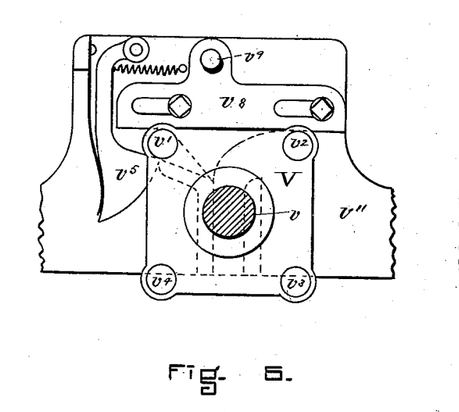
Figs. 5 and 6 are views in vertical section and rear elevation of the devices for automatically revolving the head.
Figure 6:
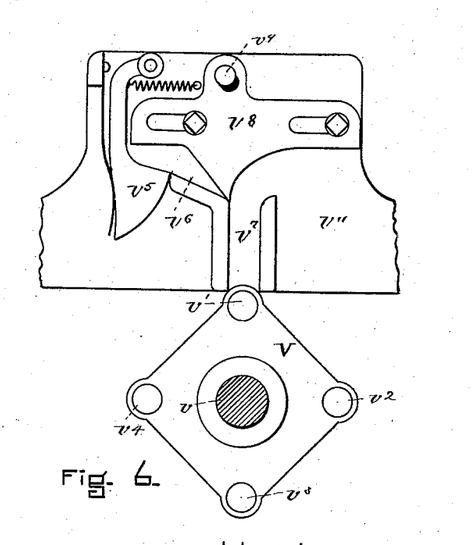
Figures 7, 8, 9, 10:
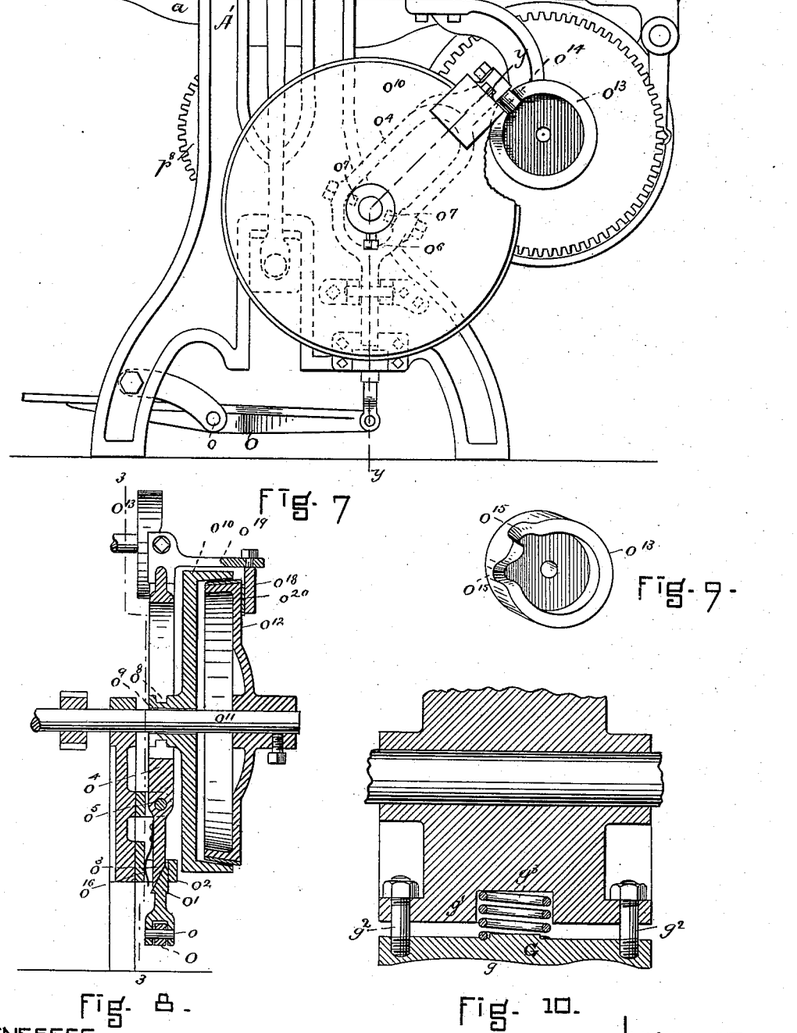
Fig. 7 is a side elevation of the lower part of the machine, showing especially the mechanism for starting and stopping the machine.
Fig. 8 is a section upon the line *y y* of Fig. 7.
Fig. 9 is a view in perspective of a cam for controlling the operation of the start and stop motion mechanism, hereinafter specified.
Fig. 10 is a vertical central section of a portion of the revolving head, showing the sole beating-out or compressing form attached thereto.
Figure 11:
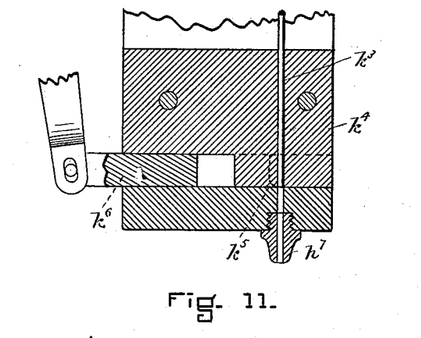
Fig. 11 represents a view in vertical section, enlarged, of the nail-pointing cutters and their holding-block.
Figure 12:
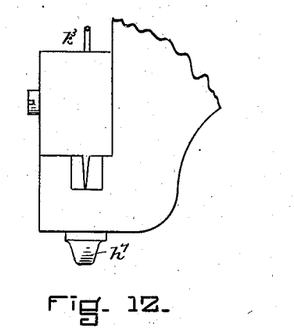
Fig. 12 is a view in end elevation of the parts shown in Fig. 11, and at the right hand thereof.
Figure 13:
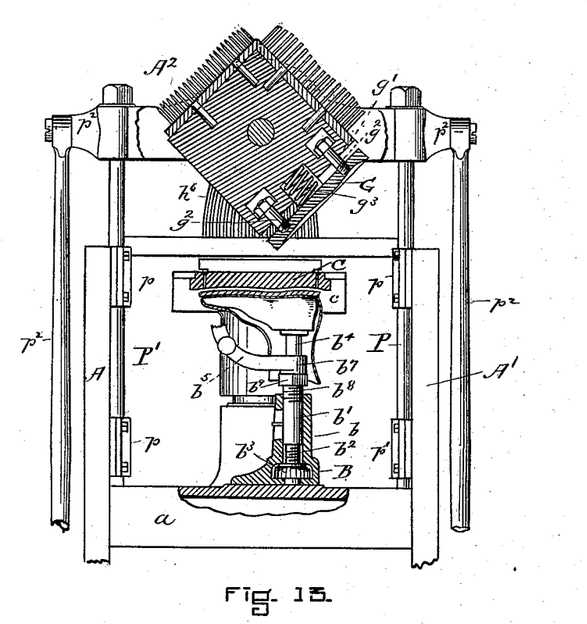
Figures 14, 15, 27:
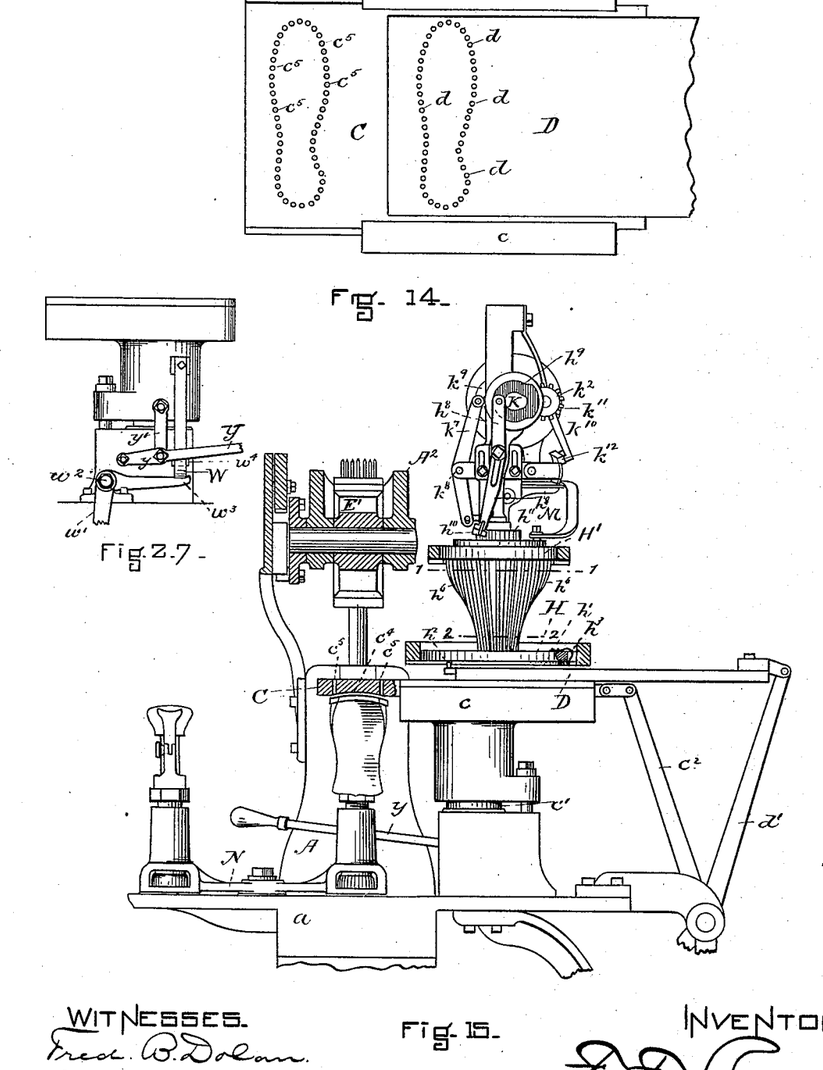
Figure 16:
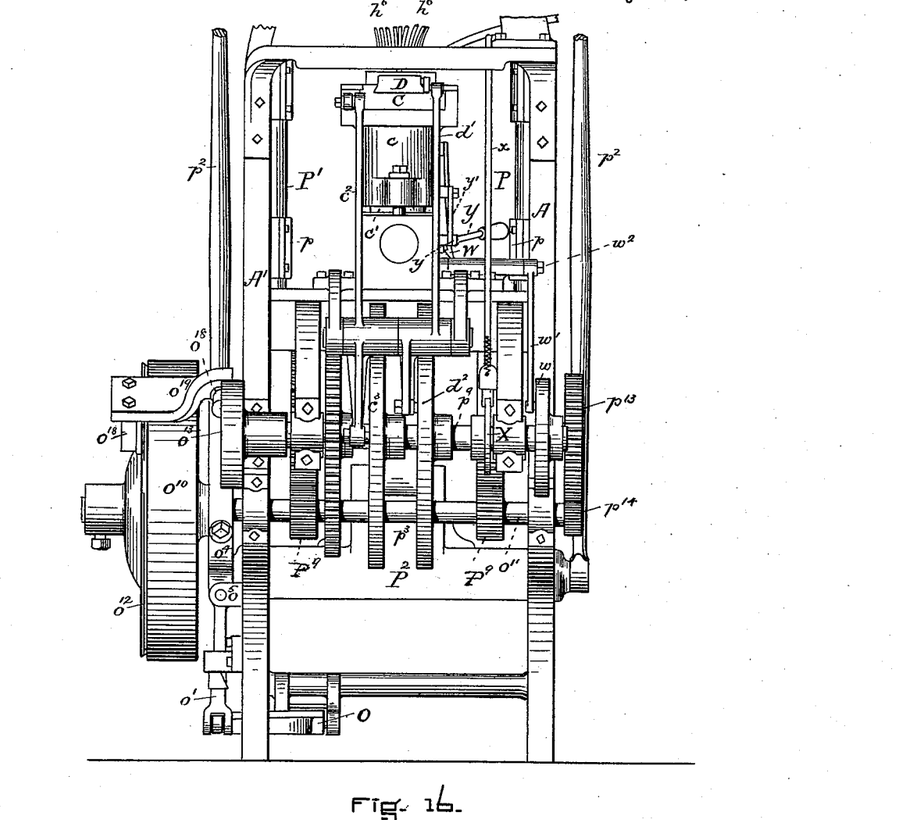
Fig. 16 is a rear elevation of the central and lower part of the machine.
Figure 17:
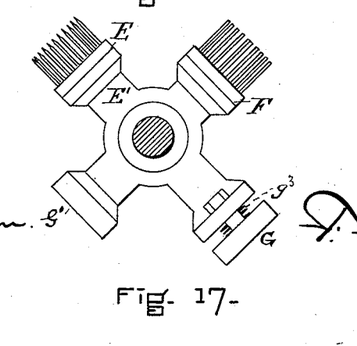
Fig. 17 is a front elevation of the revolving head.
Figure 18:
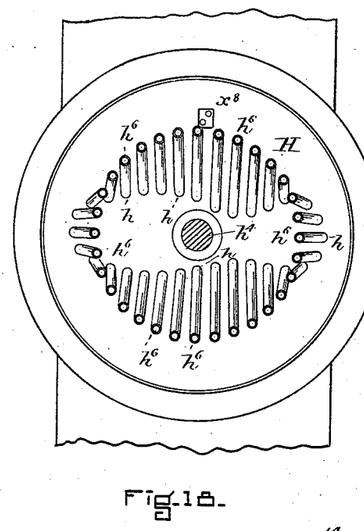
Fig. 18 is a horizontal section on the line 1 1 of Fig. 15.

The cavity in the spanking-block G is like that formed in the templet or pressure plate, and it is brought down or reciprocated after the nails have been driven to give form, shape, and evenness to the sole, and it acts in this respect as a beating-out form or die, and has all the features thereof. In Figs. 13, 14, and 15 I have shown the cavity in the templet-plate arranged crosswise the plate, and the last or shoe-support correspondingly arranged, instead of arranging them lengthwise the plate, as shown in Fig. 1. I have also shown in these figures the awls, drivers, and spanker-block as correspondingly arranged upon the revolving head, and the nail-carrier plate as likewise arranged. The object of this is to produce a strong construction, as the portion of the templet-plate which is submitted to the upward pressure will then be nearer its carriage or support, and the strain thereof will consequently be much less, and because the awl and driver block will be nearer the central line of reciprocation of the cross-head.

In Fig. 15 I show a revolving plate or bed, N, supporting two jacks, which are adapted to be moved alternately into operative position beneath the templet-plate; and when the double jack is used I have arranged the stop-motion mechanism of the machine so that the machine, instead of stopping at the highest point of the throw, stops at the lowest point of the throw, and also so as to make two and a half or three and a half reciprocations and then stop, and then half a reciprocation and stop, whereby before starting the machine the cross-head is lifted to its highest position. The object of this construction is to enable me to leave the nailed boot or shoe under pressure beneath the spanker or beating-out form or plate while another boot or shoe is being adjusted upon the other last or support; and after it has been adjusted the machine is set in operation, makes a half a revolution, and the cross-head is moved to its highest position, when the finished boot or shoe can be removed and the one to be nailed brought into operative position. Of course I do not confine my invention to a machine arranged to stop in this manner; but when two jacks are used I consider this construction advisable.

I prefer to mount the spanker or beating-out block G so as to be slightly yielding upon its support against a very powerful spring-pressure; and in Figs. 2, 3, 10, 13, and 17 I have shown this construction. The block G has the bolts or studs $g^2$, which pass through holes in the arm $g'$ of the revolving head into the block G and hold it thereto, so that it has a vertical movement in relation to the arm and against the pressure of the spring $g^3$. This method of supporting the spanking or beating out block provides it with an adjustment which is desirable, as by allowing a slight yield thereof in relation to the cross-head or the revolving head when the sole is submitted to pressure there can be no injury done to the machine or work by an excess of pressure.

The stop-motion mechanism is represented in Figs. 1, 2, 7, 8, and 20, where O is a treadle, pivoted at $o$, having at its end projecting upward a wedge-block, $o'$, pivoted thereto, which shuts into the recess $o^2$, (see Figs. 8 and 20,) against the wedge end $o^3$ of a lever, $o^4$, pivoted at $o^5$, and having a yoke, $o^6$, carrying pins $o^7$, which enter a groove, $o^8$, in the hub $o^9$ of the driven pulley $o^{10}$, which is movable on the shaft $o^{11}$. Upon the downward movement of the treadle O the driven pulley is moved upon the fixed pulley $o^{12}$, fastened to the shaft $o^{11}$, and the machine immediately begins to revolve, and the driven pulley is held in contact with the fixed pulley $o^{12}$ by means of the cam $o^{13}$ and cam-roll $o^{14}$ on the lever $o^4$, and which cam is adapted to hold the driven pulley in contact with the other pulley, and the cam holds the lever in this position until a notch or groove, $o^{15}$, is reached, when the spring $o^{16}$ automatically throws the upper end of the lever $o^4$ back and disengages the driven pulley from the fixed one, the cam $o^{13}$ unlocking the lever so that the cam-roll may shut into the recess $o^{15}$. This cam, when the machine is adapted to stop with the cross-head down, has two such recesses or grooves, one placed immediately beyond the other, so as to allow the spring $o^{16}$ and lever $o^4$ to disengage the driven pulley after half a revolution of the operating-shaft $o^{17}$ has been made.

To stop the momentum of the machine immediately after the driven pulley has been disengaged from the fixed pulley, I use a block, $o^{18}$, carried by the arm $o^{19}$, attached to the upper end of the lever $o^4$. This arm $o^{19}$ extends over the driven pulley to bring the block $o^{18}$ so that it can be moved by the movement of the lever $o^4$ against the side of the fixed pulley. The block has a leather pad, $o^{20}$, for its contacting or working surface, and in operation upon the movement of the cam $o^{13}$ to bring the recesses $o^{15}$ into place. The spring $o^{16}$ throws the upper end of the lever away from the driven pulley, and thereby brings the friction pad or brake to bear thereon, and this immediately checks or stops the revolution of the machine.

It is necessary, in order that the nails may all be driven at the proper angle to the sole, and so as to be clinched upon the iron surface of the shoe-support, that most of the awls be tapered upon one side only, and be arranged in the awl-block with relation to the work or especial hole which each is to make. For instance, it is desirable that all the holes formed be inclined slightly inward, and at the beginning of the shank this inclination should be more towards the ball, so that the awls which form holes for this portion of the sole will be fixed or have their turning surfaces arranged with special reference to the inclination, which it is necessary that the holes for receiving the nails shall have at this point; and the same is true regarding the locating and arranging of the turning surfaces of the awls for the remainder of the sole.

I prefer, on account of the number of nails simultaneously driven, that they be provided with sharp clinching-points, in order that they may turn more easily upon the iron bottom of the last or support and require less pressure or force in the driving.

I also prefer to use for driving or reciprocating the cross-head mechanism, as hereinafter specified, or its equivalent, whereby the cross-head is moved more rapidly during the lower half of its reciprocation than during its upper half. This is for the purpose of increasing the speed or momentum of the cross-head sufficiently to cause the nails to be simultaneously driven with a sharp quick blow rather than by a somewhat gradual pressure. The mechanism for accomplishing this purpose is as follows, reference being especially made to Figs. 1 and 2 in explaining it:

The cross-head $A^2$, which carries the revolving head, has the guide-rods P P', which are bolted thereto and reciprocated in the boxes $p$, bolted to the side frame A' of the machine. The ends $p'$ of the cross-head project beyond the side frames of the machine, and there is secured to these ends the connecting-rods $p^2$. (See Fig. 2.) These connecting-rods are secured at their lower ends to the lower cross-head, $P^2$, and there is arranged to project upward therefrom the extension $p^3$, which is preferably integral from the head, and has the flat surface $p^4$, upon which the surface of the cam $P^3$ on the shaft $o^{17}$ comes in contact to move the cross-head downward. The form of this cam is well shown in Fig. 1, and it will be observed that it is shaped to move the cross-heads $P^4$ $A^2$ a greater relative distance during the interval of time of one part of its revolution than during the remainder of its revolution; or, in other words, the downward movement of the cross-heads is made in about one-third of the entire time of a complete revolution of the cam, so that the downward movement, or at least the lower portion thereof, is very considerably accelerated.

The cross-heads are lifted by means of the arms $p^5$, which project upward from the block $p^3$ and the pins $p^6$ thereon, which enter the cam-grooves $p^7$ in the side of the cam. The size of the groove in relation to the pins, or the shape of the grooves in relation to the working-surface of the cam, is such as to relieve the pins from strain upon contact of the working-surface of the cam with the block $p^3$ of the lower cross-head, so that the greater part of the downward movement of the cross-head is caused by the cam-surface coming in contact with the cam-block.

The shaft $o^{17}$ is revolved by the gears $p^8$ on the shaft $o^{11}$, one each side of the cam $P^3$, and the pinions $P^9$ on the pulley-shaft $o^{11}$. The shaft $p^9$ is revolved by the gear-wheel $p^{10}$ thereon, the pinion $p^{11}$ on the shaft $p^{12}$, and the gear $p^{13}$ on the shaft $p^{12}$, which is driven by the gear $p^{14}$ on the shaft $o^{11}$, the gear $p^{10}$ making one revolution to every four revolutions of the shaft $o^{17}$.

The mechanism for revolving or turning the revolving head is like that described in the application for patent of Raymond and Henderson, filed March 18, 1885, Serial No. 159,278, with the exception that it is adapted to cause the revolving head to be turned or revolved one complete revolution upon four reciprocations of the cross-head instead of in three, as described in said application; and this revolution is accomplished by providing the disk carrying the guiding-pins with four pins instead of three.

Briefly stated, this mechanism comprises the disk V, which is fastened to the end of the revolving-head shaft $v$. It has the four pins, $v'$ $v^2$ $v^3$ $v^4$, which project horizontally therefrom. $v^5$ is a swinging latching-pawl, $v^6$, a guide upon which the pins are successively brought; $v^7$, a vertical passage in which the pins are successively reciprocated; $v^8$, the switch-block, which is given a reciprocating horizontal movement by means of the cam-pin $v^9$ and cam $v^{10}$. These parts are formed upon or carried by the cross-plate $v^{11}$, bolted to the side frames A. Upon the reciprocating movement of the cross-head the pins $v'$ $v^2$ $v^3$ $v^4$ are caused to pass successively the pawl $v^5$, and to ride down the incline $v^6$ into the vertical guiding-passage $v^7$ to pass upward therein, to be moved outward therefrom by the guiding-surface of the switch-block $v^8$, so that every reciprocation of the cross-head causes the revolving head to be moved a quarter of a revolution; and this turning or revolution of the revolving head is done during the upper part of the reciprocation of the cross-head, while during the lower part of the reciprocation of the cross-head the revolving head is locked by one of the pins above referred to, and the guiding-recess $v^7$.

The templet or pressure plate is locked automatically upon the outsole at the end of its downward movement by means of the latch W, and it is unlatched automatically after the nails have been driven by means of the cam $w$ on the cam-shaft $p^9$ and the lever $w'$, which is pivoted at $w^2$ to bring its end $w^3$ below the latch, whereby upon the upward movement thereof it disengages the latch from the latch-block $w^4$.

I prefer to operate the nail-carrier plate, the nail-distributer, and the nail-making devices, as described in my said application for patent, Serial No. 137,980, and to cause the nail-making devices and distributer to be set in operation immediately after the carrier has been moved backward and taken a load of nails from the nail-holder, and moved forward sufficiently to allow the covering or sliding plate $h'$ to be automatically moved, and also to stop the nail making and distributing devices automatically after a requisite number of nails have been made and fed. The mechanism for thus starting and stopping the nail making and distributing devices comprises the cam X upon the shaft $p^9$, the push-bar or rod $x$, the hinged arm $x'$ pivoted at $x^2$ to the lever $x^3$, which is pivoted at $x^4$, and has the surface $x^5$, which carries the friction-pad adapted to be moved against the fixed member $x^6$ of the friction-pulley $x^7$. This swinging arm $x'$ is arranged to be moved horizontally by the projection $x^8$ upon the disk H, so that to start the nail making and distributing devices the arm $x'$ is lifted by the push-rod $x$. This releases the brake or friction-device $x^5$, and allows the spring $x^9$ to move the driven portion $x^7$ of the clutch against the fixed portion $x^6$, the driven portion being movable upon the shaft K of the nail-making device, and having the lever $x^{10}$ pivoted at $x^{11}$ connected therewith, or with its hub, by means of the pins $x^{12}$, which enter the recess $x^{13}$, in the hub. The disk H having made its revolution, and the push-rod $x$ having been moved downward or fallen because no longer supported by the cam, the bar-arm $x'$ is returned to a position to be moved by the projection $x^8$ outwardly, and this causes the lever $x^3$ to push the lever $x^{10}$, being connected therewith by the arm $x^{14}$, outward sufficient to disengage the driven member $x^7$ of the pulley from the fixed member of the clutch.

The pressure or templet plate may be moved down by hand upon the outsole after it has been placed in position by means of the lever Y, pivoted at $y$, and connecting-link $y'$, fastened at one end of the lever and at the other end to the carriage supporting the pressure-plate, if desired.

Of course I do not confine myself to the use of two jacks, as one may be used where it is not desirable to employ two.

The operation of the machine is substantially as follows: The boot or shoe is placed upon the last or heel-support mounted upon the jack, and the outsole, if not previously molded, and temporarily tacked onto the insole, is placed in position upon the insole. The pressure-plate is then moved down on the sole by the lever Y. The machine is then started, the pressure-plate is moved down upon the sole with great force by the awl-holder block or by the separate pressure-block G', the holes made by the reciprocation of the awls, the nails automatically fed by the nail-carrier into position, the drivers reciprocated and nails driven, the templet and nail-holder plate automatically moved out of position, and the beating out device moved into position and reciprocated. This spanker or beating-out device is, if desired, then held locked upon the sole, as before stated, or the machine may complete its final reciprocation. The nail-making device is set in operation immediately upon the withdrawal of the nail-carrier and the nail-holder loaded with nails, the nail-carrier upon its backward movement having first taken from the nail-holder the load which had previously been deposited there.

It will be observed that by this machine the outsole can be placed upon the insole after the boot or shoe has been mounted upon the last and moved into position, and that when it is so placed the manipulation of tacking on the "outsole," as it is commonly called—that is, temporarily fastening the outsole to the insole preparatory to permanently fastening the same, is dispensed with; also, that the outsole is submitted to a molding operation before the nails are driven, which renders its previous molding unnecessary. This result is occasioned, not only because the sole is then submitted to a molding operation, but because it is immediately fastened in place to the insole while forced by the mold to the desired shape. It may be found advantageous for some classes of stock to slightly temper the outsoles before they are attached.

It will also be seen that by the use of the additional pressure-block which moves the pressure-plate down upon the outsole before the awls are driven the outsole is brought into its shape or form before the awls enter the sole; and while it is possible to move the pressure-plate vertically upon the outsole by the awl-block, or while the awls are being driven, (and I wish it to be understood that I can so operate the machine,) yet it is preferable to press the outsole upon the insole before the awls are caused to enter it.

After the outsole has been nailed by the subsequent operation of the beating-out plate or form the sole is reduced to or given its ultimate shape, is compacted under pressure, the ends of the nails made to bear more uniform relation to the surface of the sole, and the leather to be well compacted about the nails, so that a desirable finish is obtained.

While I have herein described a nail-making device for making nails from wire and for feeding them to the nail-distributer, I would say that I do not confine myself in this invention to this especial form of nail making and feeding device, as I may use in lieu thereof any of the well-known nail-making or nail-feeding machines of the market or which have been previously patented; and I include among these devices, of course, the devices for receiving nails in bulk and for sorting, distributing, and feeding the same, the distinction being that the said nails, instead of being driven from said devices by a driving mechanism into any given material, are fed to the nail distributer and carrier.

I would also state that I consider that the lifting of the jack, last, or work-support to the pressure-plate is the equivalent of the movement of the pressure-plate to the last, work-support, or jack.

While I have shown and described herein the cross-head as operated by devices which provide it with a gradually-accelerating motion, I would not be understood as limiting myself to this especial form of construction, as I may use any of the well-known mechanical devices for reciprocating the cross-head in lieu thereof.

I would also state that for certain classes of work the awls may be dispensed with, and also the pressure-block, and in that event the head would carry simply the drivers and beating-out form or block; and I would further state that the reciprocating drivers alone may be used in connection with the other parts of the machine, or that the pressure-block and drivers only may be so employed.

It is of course apparent that the nails can be driven without first forming the awl-holes; or, in other words, that the machine can be used without the reciprocating gang or group of awls.

It is also apparent that headed fastenings can be driven as well as unheaded. In this case, however, in lieu of the nail-making devices, there would be substituted any of the well-known headed nail-feeding devices, and I would mention among them the devices described in the Dunham patents, No. 184,281, dated November 14, 1876, and No. 188,874, dated March 27, 1877.

When the machine is used without the pressure-block G' and the gang of awls, or either, it will be necessary, of course, to modify the devices for revolving the head and for stopping the machine. If the pressure-block G' is not used, then there will be but three reciprocations of the machine, and the devices for revolving the head will be correspondingly modified, and the machine will be stopped at the end of two and a half or three reciprocations, and the cam $o^{13}$ will be revolved once every three reciprocations of the cross-head instead of once in every four. If only the drivers and beating-out form are used, then the devices for turning the revolving head will be arranged to turn it in every two reciprocations of the cross-head, and the cam $o^{13}$ will be revolved once in every two reciprocations of the cross-head A, and will stop the machine after one and a half reciprocations and after an additional half-reciprocation. If drivers only are used, then of course there will be no necessity for the employment of the revolving head, and the cam $o^{13}$ will have one revolution for every reciprocation of the cross-head, and will stop the machine after such reciprocation.

The pressure-block G' may be mounted upon its supporting-arm of the cross-head in the same manner in which the beating-out block G is mounted—that is, so as to be provided with a slight yielding movement in relation to its supporting-arm against the pressure of a powerful spring, if desired.

Having thus fully described my invention, I claim and desire to secure by Letters Patent of the United States—

1. In a sole-nailing machine, in combination with the last or work-support, the sole molding or laying pressure-plate C, having the sole-forming cavity $c^4$ and the holes $c^5$, and means, substantially as specified, for moving the same automatically horizontally into and out of operative position, all substantially as and for the purposes described.

2. The combination of the jack, a work-support or last carried thereby, the sole molding or laying pressure-plate C, having the sole-shaping cavity $c^4$ and the holes $c^5$, with the reciprocating-block G', adapted to be brought down automatically upon the pressure-plate and to move the same vertically to mold and compress the sole, and a lock for holding the said plate locked upon the sole, all substantially as and for the purposes described.

3. The combination of the last or work-support, the sole molding or laying pressure-plate C, having the sole-shaping cavity $c^4$ and the holes $c^5$, opening into the cavity, and arranged in the plate, as specified, the pressure-block, a gang or group of awls of varying lengths, arranged as described, and a gang or group of drivers of varying lengths, arranged as described, the said block, awls, and drivers being adapted to be brought successively into operative position and reciprocated, substantially as and for the purposes described.

4. The combination, in a sole-nailing machine, of the last or work-support, the sole molding or laying pressure-plate C, having the sole-shaping cavity $c^4$ and the holes $c^5$, opening into the cavity, and arranged in the plate as specified, the sole-nail carrier D, and the presser-block G', and the gang or group of sole-nail drivers of variable lengths adapted to be brought successively into operative position and reciprocated, all substantially as and for the purposes described.

5. The combination, in a sole-nailing machine, of the last or work-support, the sole molding or laying pressure-plate C, having the sole-forming cavity $c^4$, the holes $c^5$, the sole-nail carrier-plate D, and a reciprocating gang or group of drivers of variable lengths, all substantially as and for the purposes described.

6. The combination, in a sole-nailing machine, of the last or work-support, the sole molding or laying pressure-plate C, having the sole-shaping cavity $c^4$ and the holes $c^5$, arranged to open into the cavity and arranged in relation to each other as specified, the sole-nail carrier D, the reciprocating gang or group of sole-nail drivers of variable length, and the sole beating-out form or mold G, all substantially as and for the purposes described.

7. The combination, in a sole-nailing machine, of the last or work-support, the sole molding or laying pressure-plate C, having the sole-shaping cavity $c^4$, the holes $c^5$ opening therein, and arranged in relation thereto, as specified, means, substantially as described, for moving the same into and out of operative position, and a sole finishing or beating-out device adapted to be brought into operation after the removal of the sole molding or laying pressure-plate, all substantially as and for the purposes described.

8. The combination, in a sole-nailing machine, of the sole molding or laying pressure-plate C, having the sole-forming cavity $c^4$ and the holes $c^5$, arranged in relation to each other as specified, the sole-nail carrier-plate D, and the sole-nail holder H, all substantially as and for the purposes described.

9. The combination, in a sole-nailing machine, of a last or support for the work, the sole molding or laying pressure-plate C, having the sole-shaping cavity $c^4$ and the holes $c^5$, the sole-nail carrier D, the sole-nail holder H, and devices for automatically feeding nails thereto, substantially as specified, all substantially as and for the purposes set forth.

10. The combination, in a sole-nailing machine, of the last or work-support for the boot or shoe, the sole molding or laying pressure-plate C, having the sole-forming cavity $c^4$, and the holes $c^5$, arranged therein, as described, the sole-nail carrier D, the sole-nail holder H, and devices, substantially as specified, for making sole-nails and feeding them to the holder H, all substantially as and for the purposes described.

11. The combination of the last or support for the boot or shoe, the sole-molding or laying pressure-plate C, the lock W, the cam $w$, and the lever $w'$, all substantially as and for the purposes described.

12. The combination of the last or support for the boot or shoe, the sole-molding or laying pressure-plate C, having the sole-holding cavity $c^4$, and the holes $c^5$, horizontally movable, as specified, the sole-nail holder D, also horizontally movable, and the presser-block, a gang or group of awls, a gang or group of drivers, and the beating-out form or mold adapted to be reciprocated, and means, substantially as specified, for bringing them successively into operative position, all substantially as and for the purposes described.

13. In a sole-nailing machine, the combination of a last or work-support, a sole molding and clamping plate, C, having the holes $c^5$ through which the uniting-nails are driven, devices, substantially as specified, for arranging the gang or group of sole-fastenings and feeding them automatically into position for driving, the nail-driving devices arranged to simultaneously drive all the fastenings used in securing the sole to the insole, and a beating-out mold or device adapted to be brought into operation after the nails have been driven, all substantially as and for the purposes described.

14. The combination, in a sole-nailing machine, of the last or work-support, the sole laying or molding presser-plate C, having the sole-shaping cavity $c^4$ and the holes $c^5$, the sole-nail carrier, and nail making and feeding devices, substantially as specified, and a cam for automatically varying the length of the nails which are made by the nail-making devices, all substantially as and for the purposes specified.

15. The combination of the reciprocating cross-head with pressure-block G', a gang or group of awls, a gang or group of drivers, and the beating-out form or block G, substantially as and for the purposes described.

16. The combination of the reciprocating cross-head with the pressure-block G', a gang or group of awls, a gang or group of drivers, and the beating-out form or block G, with the connecting-rods $p^2$, the lower cross-head, $P^2$, and the cam $P^3$, all substantially as and for the purposes described.

17. The combination of the cross-head $A^2$, the connecting-rods $p^2$, the lower cross-head, $P^2$, the pulley-shaft $o^{11}$, the pinions $p^9$, the gears $p^8$, shaft $o^{17}$, and the cam $P^2$, all substantially as and for the purposes described.

18. The combination of the cross-head $A^2$, the lower cross-head P², the arms $p^5$, the cam-pins $p^6$, all substantially as and for the purposes described.

19. The combination of the cross-head carrying the beating-out block or form, with the driving-pulley and connecting devices, substantially as specified, whereby the machine is stopped at both its lowest and highest positions, all substantially as and for the purposes described.

20. The combination of the last or work-support, the sole molding or laying plate C, the sole-shaping cavity $c^4$, and the holes $c^5$, substantially as specified, the cross-head supporting the pressure-blocks, a gang or group of awls, a gang or group of drivers, and the beating-out block, the sole-nail carrier D, the pulley-shaft $o^{11}$, and connecting devices, substantially as specified, whereby the machine is stopped after every fourth reciprocation of the cross-head, all substantially as and for the purposes described.

21. The combination of the reciprocating cross-head with a gang or group of drivers, and the yielding sole beating-out block or form, all substantially as and for the purposes described.

22. The combination of the sole molding or laying pressure-plate C, having the sole-forming cavity $c^4$ arranged to extend crosswise the end of the plate, as described, the holes $c^5$, the cross-head, and the revolving head having the awl-holding block, driver-holding block, and beating-out block carried thereby, arranged to extend their length crosswise the shaft, all substantially as and for the purposes described.

23. The combination of the jack or work-support, arranged to present its side to the line of the horizontal movement of the sole molding or laying pressure-plate C, with the said pressure-plate having the sole-holding cavity $c^4$, arranged crosswise its end, all substantially as and for the purposes described.

24. The combination of the table $c$ with the horizontally-movable sole molding or laying presser-plate C, having the sole holding and shaping cavity $c^4$ arranged crosswise therein and near the end thereof, all substantially as and for the purposes described.

FREEBORN F. RAYMOND, 2D.

Witnesses:
   J. M. DOLAN,
   BOWDOIN S. PARKER.